(12) United States Patent
Best et al.

(10) Patent No.: US 8,192,863 B2
(45) Date of Patent: Jun. 5, 2012

(54) FLEXIBLE ENERGY STORAGE DEVICES

(75) Inventors: Adam S. Best, Ferntree Gully (AU); Graeme A. Snook, Vermont (AU); Anthony G. Pandolfo, Surrey Hills (AU); Anthony F. Hollenkamp, Camberwell (AU); Ilias L. Kyratzis, Brighton (AU); Richard J. N. Helmer, Geelong West (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 658 days.

(21) Appl. No.: 12/226,492

(22) PCT Filed: Apr. 18, 2007

(86) PCT No.: PCT/AU2007/000497
§ 371 (c)(1),
(2), (4) Date: Mar. 9, 2009

(87) PCT Pub. No.: WO2007/118281
PCT Pub. Date: Oct. 25, 2007

(65) Prior Publication Data
US 2009/0311587 A1 Dec. 17, 2009

(30) Foreign Application Priority Data
Apr. 18, 2006 (AU) .............................. 2006902006

(51) Int. Cl.
*H01M 10/052* (2010.01)
*H01M 10/0566* (2010.01)
*H01M 10/058* (2010.01)
*H01M 10/00* (2006.01)

(52) U.S. Cl. ............... 429/188; 429/322; 429/231.8; 429/231.95; 429/238; 429/234; 429/246

(58) Field of Classification Search .................. None
See application file for complete search history.

(56) References Cited

U.S. PATENT DOCUMENTS

| | | |
|---|---|---|
| 2,594,047 A | 4/1952 | Martinez |
| 3,023,259 A | 2/1962 | Coler et al. |
| 3,375,136 A | 3/1968 | Biggar |
| 3,494,382 A | 2/1970 | Shane et al. |
| 3,530,001 A | 9/1970 | Harivel |
| 4,092,464 A | 5/1978 | Dey et al. |
| 4,134,192 A | 1/1979 | Parkinson et al. |
| 5,294,504 A | 3/1994 | Otagawa et al. |

(Continued)

FOREIGN PATENT DOCUMENTS

AT 409 973 12/2002

(Continued)

OTHER PUBLICATIONS

Supplementary European Search Report for Co-Pending European Application No. 07 71 8744, mailed Apr. 6, 2009, 7 pages.

(Continued)

*Primary Examiner* — Krishnan S Menon
(74) *Attorney, Agent, or Firm* — Nixon & Vanderhye P.C.

(57) ABSTRACT

A flexible energy storage device comprising a flexible housing; an electrolyte contained within the housing; an anode and cathode comprise a current collector and anode/cathode material supported on the current collector. The current collector comprising a fabric substrate (101) and an electron-conductive material (102). The electron conductive material contains voids to enable penetration of the current collector by the electrolyte.

19 Claims, 12 Drawing Sheets

U.S. PATENT DOCUMENTS

| | | | |
|---|---|---|---|
| 5,486,680 | A | 1/1996 | Lieberman |
| 5,656,393 | A | 8/1997 | Boer et al. |
| 6,772,489 | B2 | 8/2004 | Imai et al. |
| 2003/0180610 | A1 * | 9/2003 | Felde et al. .................. 429/217 |
| 2007/0099080 | A1 * | 5/2007 | Pickett et al. ................ 429/188 |
| 2008/0212261 | A1 * | 9/2008 | Ajayan et al. ................ 361/502 |

FOREIGN PATENT DOCUMENTS

| | | |
|---|---|---|
| DE | 1 596 216 | 3/1970 |
| EP | 1 180 806 A2 | 2/2002 |
| GB | 2 181 884 | 4/1987 |
| JP | 2000-306611 | 11/2000 |
| JP | 2003-288906 | 10/2003 |
| WO | WO 02/31905 A2 | 4/2002 |
| WO | WO 02/058172 | 7/2002 |
| WO | WO 2004082059 A1 * | 9/2004 |

OTHER PUBLICATIONS

Examination Report issued in corresponding European Application No. 07718744.1, dated May 17, 2011, 6 pages.

MacFarland et al., "Lithium-doped plastic crystal electrolytes exhibiting fast ion conduction for secondary batteries", Nature, Nature Publishing Group, London, GB, vol. 402, Dec. 16, 1999, pp. 792-794, XP-002433191, ISSN: 0028-0836, DOI:10.1038/45514.

International Search Report for PCT/AU2007/000497, mailed Jun. 15, 2007.

International Preliminary Report on Patentability for PCT/AU2007/000497, mailed Mar. 18, 2008.

\* cited by examiner

FLEXIBLE ENERGY STORAGE DEVICES

This application is the U.S. national phase of International Application No. PCT/AU2007/000497, filed 18 Apr. 2007, which designated the U.S. and claims priority to Australia Application No. 2006902006, filed 18 Apr. 2006, the entire contents of each of which are hereby incorporated by reference.

FIELD OF THE INVENTION

The present invention relates to flexible energy storage devices, and articles comprising a flexible energy storage device.

BACKGROUND

Energy storage devices are devices such as batteries, capacitors, hybrid or asymmetric batteries and so forth which store and supply electrical energy or a current.

There are many types of energy storage devices available commercially, and energy storage devices come in different sizes and arrangements appropriate for particular applications. Most commonly, energy storage devices such as batteries for portable applications include a hard casing, typically formed from a metal, which contributes considerable weight and bulk to the device. Many such devices are cylindrical in configuration, and thus do not utilise space most efficiently for applications where space, weight and bulk are of major importance.

One application where space and weight is important is in the area of the inclusion of energy storage devices in garments, or in other objects that are worn or carried by humans. In the case of military applications, military personnel are required to have a source of electrical energy to operate equipment. In such applications, military personnel may be carrying the equipment and energy storage device for many days, and thus comfort, weight, bulk and safety are of critical importance. Other applications where these considerations are of importance are in the area of operating portable electronic devices, such as MP3 players, mobile phones, radios, and in medical monitoring devices.

It has been recognised by the applicant that a flexible energy storage device, which can be incorporated into a flexible article such as a garment, could provide many benefits in these applications compared to rigid energy storage devices. However, for such devices to be a possibility, the flexibility must not compromise the performance of the storage device. In addition, for military operations, the components of the device should desirably not be overly injurious to the military personnel should it be ruptured or damaged in a conflict situation.

SUMMARY

According to the present invention there is provided a flexible energy storage device comprising:
  a flexible housing;
  an electrolyte contained within the housing;
  an anode comprising a current collector and anode material supported on the current collector, the current collector comprising a fabric substrate and an electron-conductive material, wherein the electron-conductive material contains voids to enable penetration of the current collector by the electrolyte; and
  a cathode comprising a current collector and cathode material supported on the current collector, the current collector comprising a fabric substrate and an electron-conductive material, wherein the electron-conductive material contains voids to enable penetration of the current collector by the electrolyte.

The electrolyte may be any electrolyte known in the art, but according to one embodiment, the electrolyte is an ionic liquid.

The anode material may be of any type known in the art, but according to one embodiment, the anode material is lithium metal, such that the energy storage device is a lithium metal energy storage device, such as a lithium metal battery.

Depending on the nature of the electrolyte material, the device may further comprise a separator positioned between the cathode and the anode. The separator may be of any appropriate type known in the art, and according to one embodiment is a fabric separator. For polymer electrolytes, a separator may not be required.

There is also provided an article comprising a flexible energy storage device as described above. Such articles include garments, jackets, medical articles such as monitoring devices for medical applications or otherwise, bandages and wound dressings, military equipment, portable electronic devices, mobile (cell) phones, radios and so forth. In the case of garments, the flexible energy storage device, incorporating fabric substrate-based electrodes, should not adversely affect the textile properties of the host garment, compared to the host garment in the absence of the flexible energy storage device. Properties of the host garment that should be retained are thermal properties, mechanical properties of the fabric of the host garment, moisture management, barrier and airflow properties. This may be achieved by appropriate placement of the flexible energy storage device, but alternatively or additionally by design features of the flexible energy storage device.

DETAILED DESCRIPTION

Energy Storage Devices

Figure 1:
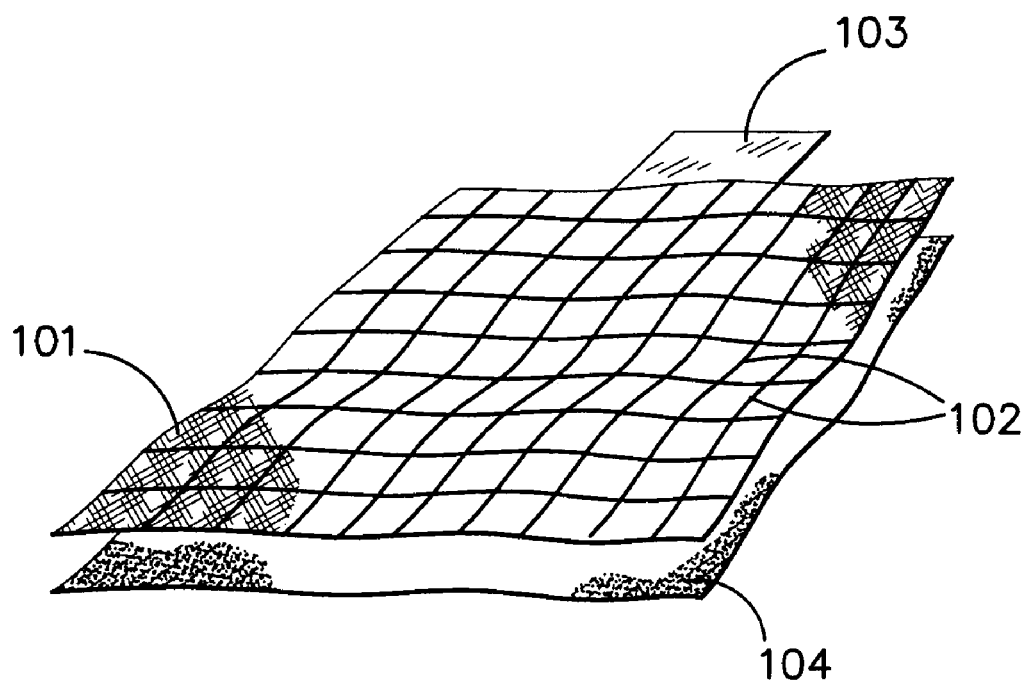
FIG. 1 is a perspective view of a current collector used in one embodiment of the energy storage device.

The types of energy storage devices that are encompassed by the present application include batteries, hybrid or asymmetric supercapacitors, capacitors, and so forth.

Of particular interest are batteries and hybrid supercapacitors. The term battery encompasses single and multiple cells.

The energy storage devices are considered to be flexible in that they do not contain a rigid housing, and each of the anodes and cathodes are formed from flexible fabric material. Of course, the devices may contain some small components such as positive and negative terminals for electrical connection to the device, which may not be flexible, and this is acceptable provided that the overall device is capable of flexing. In other embodiments, positive and negative terminals may not be required. This is especially the case if the energy storage device is integrated into a host garment, or is integrated with a device being powered by the energy storage device, or any other components or cells.

Current Collector

Each of the anode and the cathode comprises a current collector which is based on a fabric.

The fabric may be woven or non-woven, and formed from natural fibres, non-natural fibres or a combination thereof.

Natural fibres include, notably, cellulosic fibres and proteinaceous fibres, such as cotton, hemp and wool. Synthetic materials include the range of polymers that have been made in a fibre or filament form, including polyalkylenes (and homopolymers or copolymers; examples of the homopolymers being polyacrylonitrile and polypropylene); polyamides including nylon (such as nylon 6 and nylon 66), Kevlar® and Nomex®; polyurethanes, including polyurethane block copolymers (such as Lycra®); polyureas (and block copolymers thereof such as polyurethaneureas); polyesters such as polyethylene terepthalate (PET); and synthetic cellulose-derived fibres, such as rayon, and combinations thereof. Such natural, non-natural and combinations of fibres may be woven, knitted, felted, thermally bonded, hydroentangled, spunbonded, meltblown, electrospun or formed by other nonwoven processes, or combinations of processes, into a fabric. Synonyms for the term fabric are textile and cloth. The fabric is required to have voids, or a degree of porosity, to enable penetration or wetting by the electrolyte, and to support the electroactive cathode/anode materials.

The fabric, which supports the electron-conductive material, may itself be conductive or non-conductive, but will typically be non-conductive in the absence of the electron-conductive material.

The term "non-conductive" means that the fabric (in the absence of the electron-conductive material) is non-conductive, or has very low conductivity. Non-conductive is defined as having a surface resistivity of greater than $10^{11} \Omega/\square$. Conductivity is the converse of resistivity, which is measured in the art in units of ohms per square ($\Omega/\square$).

Any of the electron-conductive materials known in the art can be used in the current collector of the device. Exemplary electron-conductive materials are metals or metal alloys, such as copper, silver, nickel, aluminium, gold, titanium and so forth, and alloys thereof. Copper is of interest for use as the electron-conductive material for anodes where the electroactive anode material is lithium metal, and silver for the cathode in such a lithium-metal based device. Conductive non-metallic materials can also constitute the current collector, including conductive carbon materials such as carbon fibres and carbon nanotubes, conductive carbon yarns, conductive ceramics and conductive oxides. Conductive carbon fibres are particularly suitable.

The fabric of the current collector is a substrate for supporting an electron-conductive material. It is important that the electron-conductive material be supported on the current collector in such a way that the fabric provides the current collector with flexibility, robustness and porosity, and the amount and arrangement of electron-conductive material supported by the fabric does not adversely impact on this to such an extent that the current collector becomes rigid, non-porous and/or mechanically weak.

The electron-conductive material is required to contain voids to enable penetration of the current collector by the electrolyte. Consequently metal foil-type or continuous coatings of a metal onto the fabric current collector are not envisaged. Such foils and two-dimensionally continuous coatings are insufficiently robust and do not facilitate good exposure to the electrolyte.

A range of current collectors that are formed by techniques other than dip-coating of a fabric have been considered in particular. One current collector of interest is formed by coating fibres with an electron-conductive material (such as a metal), prior to forming the fibres into a fabric using any of the woven or non-woven or knitted (or a combination thereof) fabric formation techniques described above. The term fibre in this context encompasses multifilamentous fibres, threads and yarns. As a consequence of this formation technique, voids remain between the weave or network of fibres to enable penetration of the metalised fabric by the electrolyte. If the metal does not entirely coat the fibres this leaves access for the electrolyte to penetrate the fibres, which further enhances contact between the electrolyte and the electron-conductive material. In cases where electron-conductive metal material thoroughly coats the fabric fibres, and provides an extensive metal network to give good electron transport properties.

Another type of current collector comprises a woven or non-woven fabric having an array of conductive threads such as metal wires or conductive carbon yarn extending through the fabric. The array of thread, wires or yarn may be woven into the fabric, and the fabric may itself be a woven fabric. The array may be one in which the thread extend from one end of the fabric to another end of the fabric, to be terminated at a current collector tab, or the array may be in the form of a two-dimensional grid, or otherwise. The fabric provides a support substrate for the conductive thread array. In this embodiment, the spacing between the adjacent threads may be between 0.1 mm and 20 mm, preferably 1.0 mm-10 mm, and most preferably 1.5 mm and 3 mm.

The same type of current collector can be used for each of the cathode and anode, or different current collectors can be used. In fact, the current collector for each of the anode and the cathode could be formed from regions of a continuous sheet of fabric. Typically this will involve folding of the fabric. In this case, the separator may be formed from a separate material that is interposed between the folded current collector fabric sheet, or it could be a region of the fabric that contains no electon-conductive region.

In one embodiment, each electrode (anode and cathode) of the energy storage device is formed from the fabric-based current-collector. In this event, the separator may also be a fabric separator.

Anode Material

Any of the known types of anode materials suitable for use in energy storage devices may be used. Of particular interest are lithium metal, lithiated carbonaceous materials (such as lithiated graphites, activated carbons, hard carbons and the like), lithium intercalating metal oxide based materials such as $Li_4Ti_5O_{12}$, metal alloys such as Sn-based systems and conducting polymers, such as n-doped polymers, including polythiophene and derivatives thereof. For a description of suitable conducting polymers, reference is made to P. Novak, K. Muller, K. S. V. Santhanam, O. Haas, "Electrochemically active polymers for rechargeable batteries", Chem. Rev., 1997, 97, 207-281, the entirety of which is incorporated by reference.

In the construction of an energy storage device, and particularly batteries, it is common for the anode material to be deposited on the current collector during a formation stage, from the electrolyte. Accordingly, the references to the requirement of an anode material in the anode encompass the presence of an anode-forming material in the electrolyte that will be deposited on the anode during a formation stage.

In the situation where an anode material is applied to the current collector prior to construction of the energy storage device, this may be performed by preparing a paste of the anode material (using typical additional paste components, such as binder, solvents and conductivity additives), and applying the paste to the current collector. Examples of suitable anode material application techniques include one or more of the following:
(i) Coating;
(ii) Doctor-blading;
(iii) Chemical polymerisation onto the surface, in the case of the conductive polymers;
(iv) Printing, such as by ink-jet printing;
(v) Electro-deposition (this technique may involve the inclusion of redox active materials or carbon nanotubes);
(vi) Electro-spinning (this technique may involve the application of multiple layers, along with the inclusion of carbon nanotubes when applying a conductive polymer);
(vii) direct inclusion of the anode material in the polymer forming a synthetic fibre material-based fabric, through extrusion and/or electrospinning of the synthetic fibre;
(viii) vapour deposition and/or plasma reactor deposition.

It is noted that the anode material may be applied in the form of the anode material itself, or in the form of two or more anode precursor materials that react in situ on the current collector. In this event, each anode precursor material can be applied separately by one or a combination of the above techniques.

Cathode Material

Any of the known types of cathode materials suitable for use in energy storage devices may be used. Of particular interest are lithium intercalating metal oxide materials such as $LiCoO_2$, $LiFePO_4$, $LiMn_2O_4$, $LiMnNiO_4$ and analogues thereof or conducting polymers, redox conducting polymers, capacitor cathode materials, and combinations thereof. Examples of lithium intercalating conducting polymers are are polypyrrole, polyaniline, polyacetylene, polythiophene, and derivatives thereof. Examples of redox conducting polymers are diaminoanthroquinone, poly metal Schiff-base polymers and derivatives thereof. Further information on such conducting polymers can be found in the Chem. Rev. reference from above. Examples of capacitor cathode materials are high surface area materials, such as activated carbon, which may be in fabric, cloth or particulate form.

Cathode materials are typically applied to the current collector prior to construction of the energy storage device. It is noted that the cathode material applied may be in a different state, such as a different redox state, to the active state in the battery, and be converted to an active state during a formation stage.

Suitable methods for applying the cathode material (with the optional inclusion of additives such as binders, conductivity additives, solvents, and so forth) are as described above in the context of the anode material.

Wettability of Fabric Cathode and Anode

The surface of the fabric cathode and anode needs to be sufficiently low to be wet by the electrolyte, and to allow good penetration of the fabric cathode and anode by the electrolyte. This can be assisted by surface modification of the fabric cathode and/or anode. Surface modification is well known in the art of metal and polymer surface treatments. Any of the known surface treatment techniques known for treating metal and polymer surfaces (such as before bonding) can be used, including the following:
(i) Chemical treatment. Acid or base are examples of chemical treatment agents.
(ii) Plasma treatment.

Electrolyte

In its broadest scope, any electrolyte type appropriate for the given anode and cathode materials, as known in the art, may be used.

Such electrolytes include aprotic solvent based electrolytes such as ethylene carbonate:propylene carbonate with lithium mobile ions, such as $LiPF_6$, aqueous acid electrolytes, and so forth—as is appropriate to the given anode and cathode combination.

According to one preferred embodiment, an ionic liquid electrolyte is used. In the case of a lithium-metal based energy storage device, the ionic liquid electrolyte is suitably one that can cycle a lithium metal electrode. Suitable ionic liquids include those disclosed in PCT/AU2004/000263, the entirety of which is incorporated by reference.

Ionic liquids, which are sometimes referred to as room temperature ionic liquids, are organic ionic salts having a melting point below the boiling point of water (100° C.).

Any of the ionic liquids known in the art may be used. Particular examples of interest are salts of the pyrrolidinium- and piperidinium-based cations. Such cations are based on a pyrrolidinium ring or a piperidinium ring structure, with optional substitution at one or more of the ring carbon atoms, and two alkyl or halogenated alkyl substituents at the ring nitrogen atom. The alkyl or halogenated alkyl groups on the ring nitrogen atom may be the same or different, and are typically different. Typically the N-substitutents on the ring are N-methyl, N-(ethyl, propyl, butyl, pentyl or hexyl).

The anion counterion may be any counterion that forms an ionic liquid with the cation component (such as the pyrrolidinium or piperidinium cation component). Suitable examples are as follows:
(i) bis(trifluoromethylsulfonyl)imide (the term "amide" instead of "imide" is sometimes used in the scientific literature) or another of the sulfonyl imides, including the bis imides and perfluorinated versions thereof. This class includes $(CH_3SO_2)_2N^-$, $(CF_3SO_2)_2N^-$ (also abbreviated to $Tf_2N$) and $(C_2F_5SO_2)_2N^-$ as examples. The bis imides within this group may be of the formula $(C_xY_{2x+1}SO_2)_2N^-$ where x=1 to 6 and Y=F or H.
(ii) $BF_4^-$ and perfluorinated alkyl fluorides of boron. Encompassed within the class are anions of the formula $B(C_xF_{2x+1})_aF_{4-a}^-$ where x is an integer between 0 and 6, and a is an integer between 0 and 4.
(iii) Halides, alkyl halides or perhalogenated alkyl halides of group VA(15) elements. Encompassed within this class are anions of the formula $E(C_xY_{2x+1})_a(Hal)_{6-a}^-$ where a is an integer between 0 and 6, x is an integer between 0 and 6, y is F or H, and E is P, As, Sb or Bi. Preferably E is P or Sb. Accordingly this class encompasses $PF_6^-$, $SbF_6^-$, $P(C_2F_5)_3F_3^-$, $Sb(C_2F_5)_3F_3^-$, $P(C_2F_5)_4F_2^-$, $AsF_6^-$, $P(C_2H_5)_3F_3^-$ and so forth.

(iv) $C_xY_{2x+1}SO_3^-$ where x=1 to 6 and Y=F or H. This class encompasses $CH_3SO_3^-$ and $CF_3SO_3^-$ as examples.

(v) $C_xF_{2x+1}COO^-$, including $CF_3COO^-$ (vi) sulfonyl and sulfonate compounds, namely anions containing the sulfonyl group $SO_2$, or sulfonate group $SO_3^-$ not covered by groups (i) and (iv) above. This class encompasses aromatic sulfonates containing optionally substituted aromatic (aryl) groups, such as toluene sulfonate and xylene sulfonate (vii) cyanamide compounds and cyano group containing anions, including cyanide, dicyanamide and tricyanomethide (viii) Succinamide and perfluorinated succinamide (ix) Ethylendisulfonylamide and its perfluorinated analogue (x) $SCN^-$ (xi) Carboxylic acid derivatives, including $C_xH_{2x+1}COO^-$ where x is an integer between 1 and 6

(xii) Weak base anions (xiii) Halide ions such as the iodide ion

Amongst these anions, the preferred classes are those outlined in groups (i), (ii), (iii), (iv) and (vi) above, and particularly group (i).

The term "alkyl" is used in its broadest sense to refer to any straight chain, branched or cyclic alkyl groups of from 1 to 20 carbon atoms in length and preferably from 1 to 10 atoms in length. The term encompasses methyl, ethyl, propyl, butyl, s-butyl, pentyl, hexyl and so forth. The alkyl group is preferably straight chained. The alkyl chain may also contain hetero-atoms, a halogen, a nitrile group, and generally other groups or ring fragments consistent with the substituent promoting or supporting electrochemical stability and conductivity.

Halogen, halo, the abbreviation "Hal" and the like terms refer to fluoro, chloro, bromo and iodo, or the halide anions as the case may be.

The bis(trifluoromethylsulfonyl)imide salts of N-ethyl N-methyl pyrrolidinium bis(trifluoromethylsulfonyl)imide melt at 86° C., N-prepyl N-methyl pyrrolidinium bis(trifluoromethylsulfonyl)imide at 13° C. and N-butyl N-methyl pyrrolidinium bis (trifluoromethylsulfonyl) imide at −18° C., in the absence of Li salt or other additives. The melting points vary with additives, but are most often lower. Thus, the appropriate cation can be selected to provide an electrolyte composition that is liquid at the typical usage temperatures and has the required stability and cycle life for the applications envisaged.

In the case of ionic liquid electrolytes for lithium-based energy storage devices, the electrolyte contains lithium mobile ions, otherwise referred to as a lithium dopant. This may be included in the electrolyte in the form of a lithium salt, comprising lithium ions and counterions. The counterion may be the same as the counterion for the ionic liquid, or it may be different. It is typically the same. The amount of the lithium can be between 0.01% and 90% of the overall ionic liquid by weight, preferably between 1 and 49% by weight. It is usual to refer to the lithium concentration of the electrolyte in moles of lithium ions per kilogram of total electrolyte, and in this unit the lithium is suitably present in an amount of from 0.01 to 2.0 mol/kg, preferably 0.1-1.5 mol/kg, and most preferably 0.2-0.6 mol/kg.

The electrolyte may comprise one or more further components, including one or more further room temperature ionic liquids, one or more solid electrolyte interphase-forming additives; one or more gelling additives; counterions to the lithium ions which are either the same as or different to the anions of the room temperature ionic liquid; and organic solvents.

Solid electrolyte interphase-forming additives are shown to improve the deposit morphology and efficiency of the lithium cycling process. The gelling additives provide a gel material while retaining the conductivity of the liquid.

The use of ionic liquid electrolyte has a number of advantages in terms of safety, and ability to cycle the lithium metal electrode (where the energy storage device is lithium-based). Such electrolytes have negligible vapour pressure and limited flammability, meaning that the risk of explosion is extremely low. In addition, they have low toxicity in the event of any leakage. This is of particular importance in military applications, where there is a risk of puncture of energy storage devices, especially in a combat situation.

Separators

The separator may be of any type known in the art. A range of fabric-type separators are available, and are suitable for use in the device of the present application.

Stack Pressure

In an energy storage device, it is important to maintain stack pressure across the cell (anode, cathode and electrolyte combination) to provide low ESR values and low self-discharging rates. In the present application, where the anodes and cathodes are based on fabric, and preferably the separator is a fabric-based separator, any techniques known in the art of textiles may be used to secure the anode-separator-cathode layers together. Suitable techniques include stitching or weaving (for example, in the Jacquard style) of the layers together.

Applications

There is also provided an article comprising a flexible energy storage device as described above. Such articles include garments, jackets, medical articles such as monitoring devices for medical applications or otherwise, bandages and wound dressings, military equipment, portable electronic devices, mobile (cell) phones, radios and so forth.

In the case of garments that host a flexible energy storage device, it is desired that the textile properties of the garment not be significantly affected by the flexible energy storage device, in terms of thermal properties, mechanical properties, moisture management, barrier and airflow properties.

Mechanical properties relate to the strength, elasticity and drape of the fabric.

Thermal properties relate to the heat flow properties through the host garment. The adverse impact of the presence of the flexible energy storage device on the thermal properties the host garment can be mitigated by phase change materials such as everlast fabrics and the use of highly thermally conductive materials in the energy storage device (metal and carbon nanotube).

Moisture management refers to the moisture flow and wicking of material through hydrophobic and hydrophilic regions of the host garment.

Barrier properties relates to the exclusion properties of the host garment to certain sized particles or dangerous biomaterials.

Airflow relates to air flow properties from and to the person wearing the garment.

These properties can be achieved through appropriate selection of integers of the flexible energy storage device and design of the garment, and physical design of the energy storage device.

Interpretation

References to "a" or "an" should be interpreted broadly to encompass one or more of the feature specified. Thus, in the case of "an anode", the device may include one or more anodes.

In this application, except where the context requires otherwise due to express language or necessary implication, the word "comprise" or variations such as "comprises" or "comprising" is used in an inclusive sense, i.e. to specify the presence of the stated features but not to preclude the presence or addition of further features.

EXAMPLES

In FIGS. 1 to 6, a variety of current collector arrangements are illustrated which are suitable for incorporation as part of the anode and/or cathode of the energy storage device.

FIG. 1

According to a first embodiment illustrated in FIG. 1, a non-conductive fabric (101) is formed with conductive metal wires (102) woven into the fabric structure in two dimensions. The conductive metal wires (102) comprise either mono-filaments, multi-filaments or staple filaments (otherwise known as yarn). The current collector also contains a current collector tab (103) on one side of the material, through which the current collector can be connected to an electrical terminal for the energy storage device. A layer of an electro-active anode material or cathode material can be applied to the current collector for formation of an anode or a cathode. In the case of conductive polymers or electro-active intercalation material (104) these are suitably applied by one of the following methods:

(i) Coating (using mixtures of active materials, carbons, graphites, polymer binders and solvents in ratios used by those skilled in the art);
(ii) Doctor-blading (using mixtures of active materials, carbons, graphites, polymer binders and solvents in ratios used by those skilled in the art);
(iii) Chemically polymerisation onto the surface, in the case of the conductive polymers;
(iv) Printing, such as by ink-jet printing;
(v) Electro-deposition (this technique may involve the inclusion of redox active materials or carbon nanotubes);
(vi) Electro-spinning (this technique may involve the application of multiple layers, along with the inclusion of carbon nanotubes when applying a conductive polymer).

FIG. 2

Figure 2:
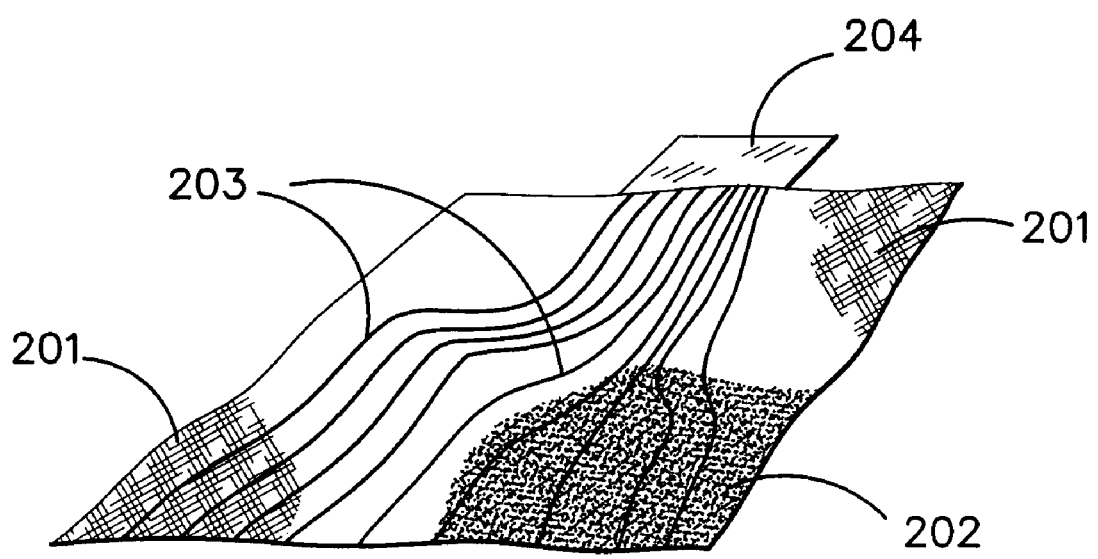
FIG. 2 is a perspective view of a current collector used in a second embodiment of the energy storage device, with an enlarged section showing a cross-section of one part thereof.

According to a second embodiment illustrated in FIG. 2, the current collector comprises a non-conductive fabric (201) which is coated with a coating of an electro-active anode or cathode material (eg. a conducting polymer, 202) prior to the application of an electron-conductive material in the form of conductive metal wires (203). The conductive metal wires (203) are connected to a current collector tab (204). The conductive metal wires can be mono-filaments, multi-filaments or staple filaments (otherwise known as a yarn). For optimal performance of this current collector, the metal wires are spaced 1.5-3 mm apart across the width of the fabric. The anode or cathode material, such as a conductive polymer or electro-active intercalation material (202) can be applied by the same methods described in the context of the first embodiment illustrated in FIG. 1.

FIG. 3

Figure 3:
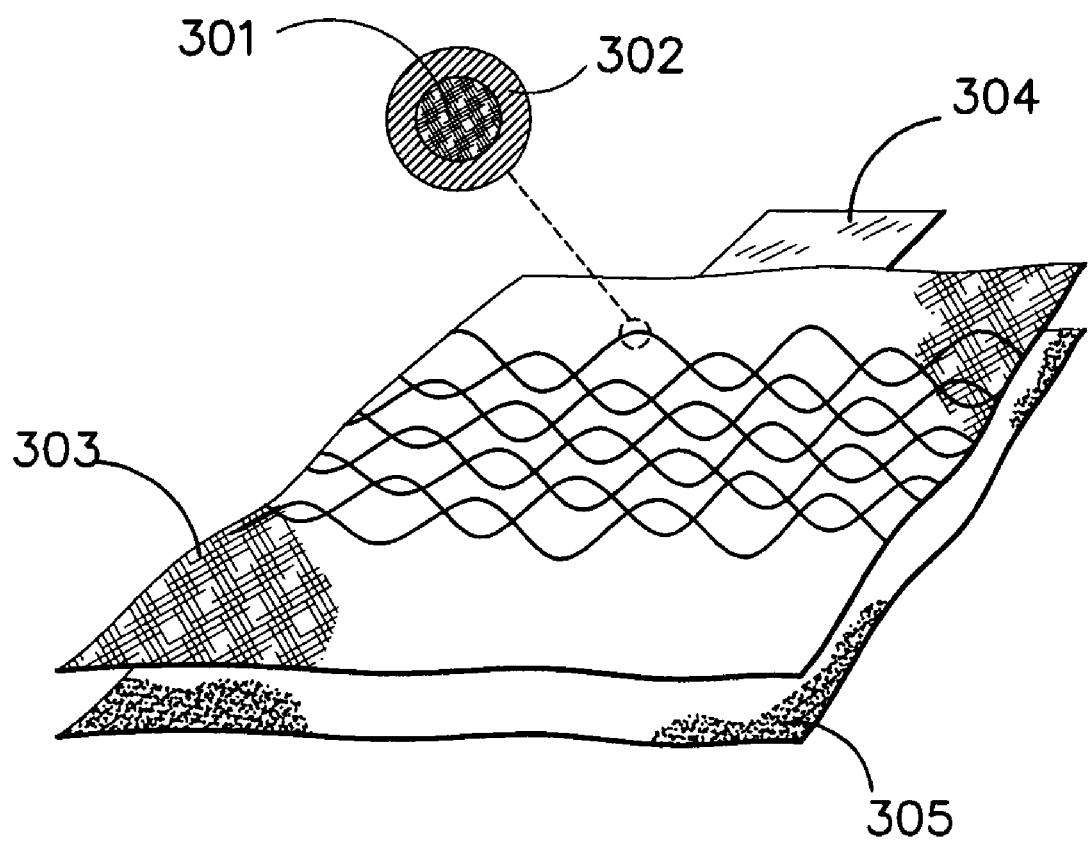
FIG. 3 is a perspective view of a current collector used in a third embodiment of the energy storage device.

According to a third embodiment illustrated in FIG. 3, a knittable fibre thread or yarn (301) is coated with metal (302), and then knitted into a fabric (303). The magnified section illustrated in this figure shows one thread in cross-section with a fibre core (301) and a coating of the metal (302). In another variation, fibres in non-thread form can be coated in metal, before being spun into a fibre or thread form and knitting into a fabric. The metallised fabric (303) has some elasticity due to the knitted structure, as well as good electrical conductivity due to the numerous contact points between the metallised fibres. A current collector tab is positioned on one edge of the knitted metallised fabric (303). To this, a laminated or hot melt layer of woven or non-woven fabric is applied (304) to make the current collector more robust. Specifically, in the case of a loose knit fabric, the inclusion of an additional flexible structural support can assist in providing structural stability. This current collector can then have anode or cathode material applied to it to form an anode or cathode. According to the embodiment illustrated, the current collector is impregnated with a polypyrrole conductive polymer material. The polypyrrole can be applied by the means described in the context of the first embodiment described with reference to FIG. 1.

FIG. 4

Figure 4:
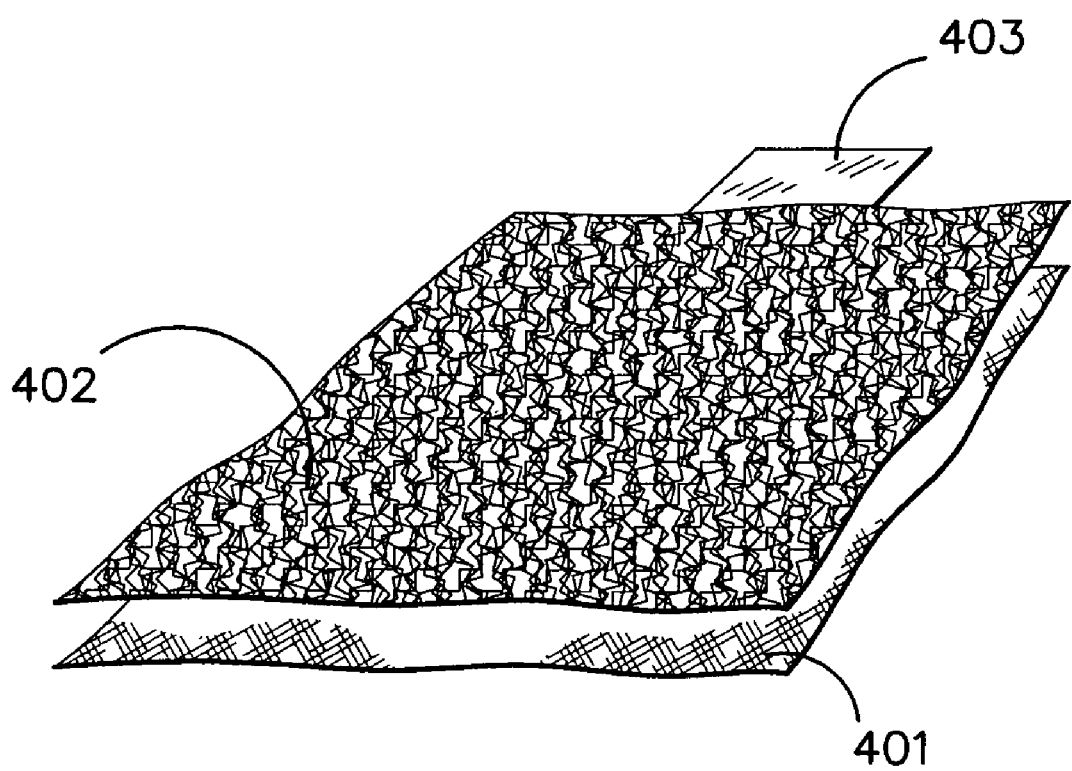
FIG. 4 is a perspective view of a current collector used in a fourth embodiment of the energy storage device.

According to a fourth embodiment illustrated in FIG. 4, the current collector comprises a woven or non-woven non-conductive fabric (401) that has woven or non-woven metallised fibres (402) applied to the surface by hot-melting or laminating techniques. These metallised fibres illustrated are stable-fibres, although in a variation continuous fibres can be used. These fibres are connected to a current collector tab (403) on one side of the material. An anode or cathode material can be applied to this current collector, or can be deposited in situ in a formation stage.

FIG. 5

Figure 5:
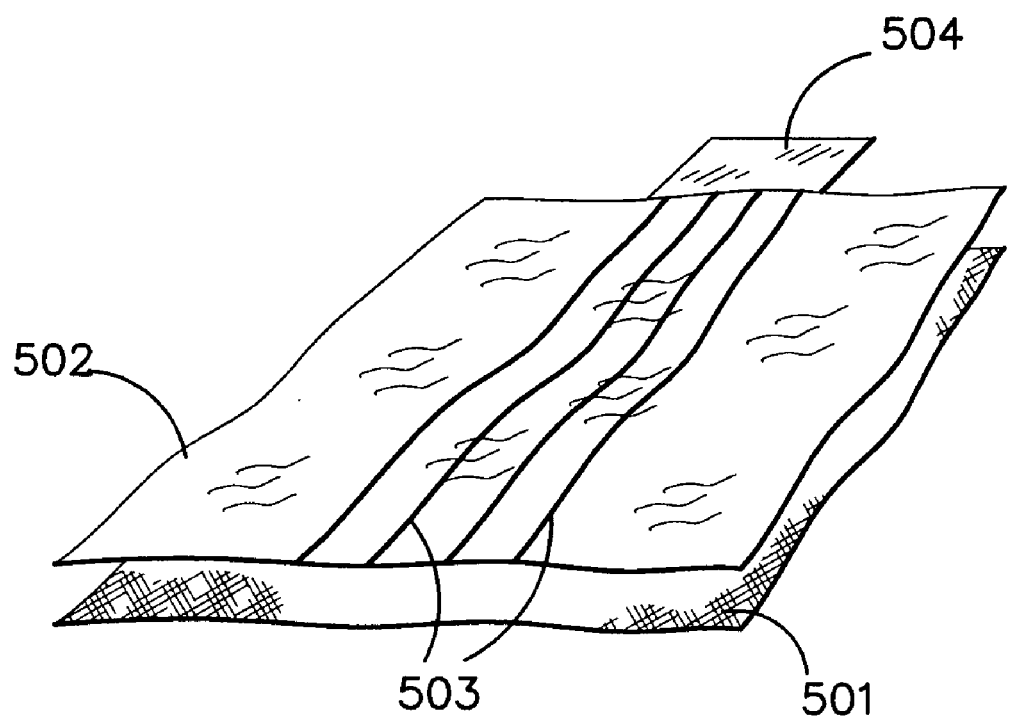
FIG. 5 is a perspective view of a current collector used in a fifth embodiment of the energy storage device.

According to a fifth embodiment illustrated in FIG. 5, the current collector comprises a non-conductive fabric (501) to which an electro-active cathode or anode material is applied (such as a conductive polymer or electro-active intercalation material) (502), followed by weaving of conductive metal wires through the layer. These metal wires are connected to a current collector tab (503).

FIG. 6

Figure 6:
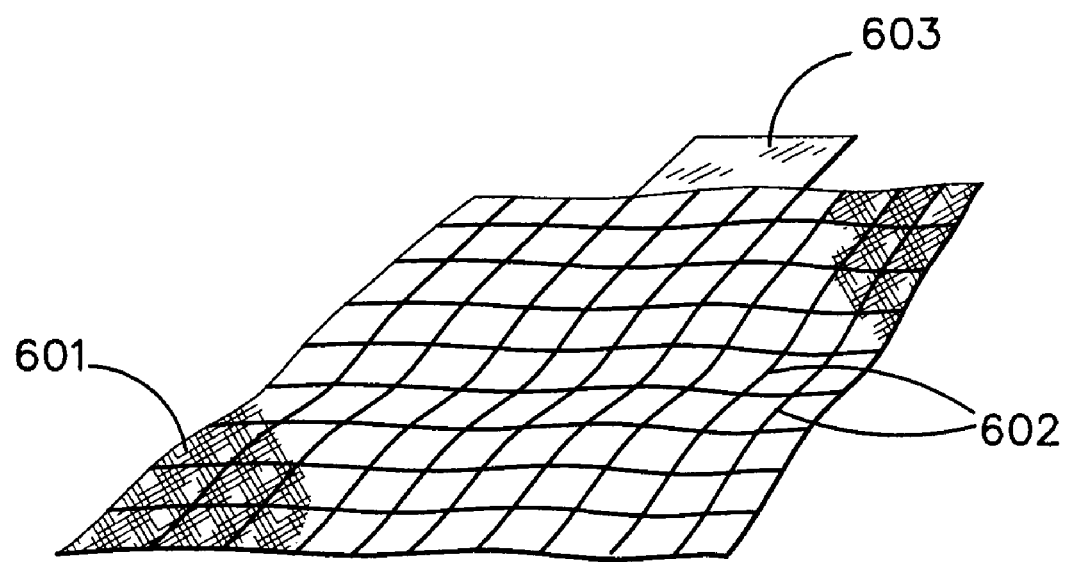
FIG. 6 is a perspective view of a current collector used in a sixth embodiment of the energy storage device.

According to a sixth embodiment illustrated in FIG. 6, the current collector comprises non-conductive fabric (601) that has a conductive carbon-nanotube yarn (602) woven through in place of the metal wires that are woven through the fabric in the embodiment of FIG. 1. These yarns are much stronger than metal wires and have good electrical conductivity.

Assembly and packaging of the energy storage device:

In the following, a number of techniques for forming a battery and an asymmetric super-capacitor are described with reference to FIGS. 7 and 8 to 11.

FIG. 7

A sheet of non-conductive polyethylene fabric is provided with three regions—one region (701) for forming the current collector of the anode, a second region (702) for forming the current collector of the cathode, and an intermediate region (704), containing no metalisation, for forming the separator. The anode-forming region is prepared through weaving of wires through the fabric, and termination of the wires at the current collector tab (703a). The metal wires at the anode region are formed from copper. Similarly the cathode-forming region is formed with woven wires through the fabric, with these wires terminating at current collector tab (703*b*). The current collector tabs are exposed.

The anode material may be applied to the current-collector prior to construction into the device, or may be deposited during a formation stage (as is the case in the embodiment described here). The cathode material is typically applied prior to the following folding stage. In this example, the cathode material comprises a cathode material composition including graphite, polypyrrole conductive polymer and binder.

The layers are folded in such a way that the intermediate region (704) forming the separator is positioned between the electrode layers. The layers are then stitched together in order to put pressure on the layers to ensure good contact between the electro-active materials and the metal current collector wires or metallised fabrics. This pressure is important to maintain low resistance between the active materials (graphite, conducting polymers, etc.) and the metal wires or fibres. In addition, the pressure allows for uniform lithium metal deposition on the Cu anode wires (or metallised fibres in other embodiments).

The exposed or outer faces of the anode and cathode are then coated in a sealing material (706). In this case an acrylate polymeric sealant is applied by a padding technique to the back of the fabric. Any of the available sealant materials available in the art may alternatively be used, such as a urethane, silane, or so forth. The cell is vacuum dried to ensure all moisture is removed before a silicon sealant (707) is then used around the edge of the cell to stop any leaks from the edges, with the exception of two small sections or gaps (708) which are left to enable filling of the cell with electrolyte (709). The cell is then filled from one gap in the sealed pouch before sealing both holes with additional silicon sealant. The coating (706) and sealant around the edges together form a housing which contains the anode, cathode, separator and electrolyte.

Figure 7:
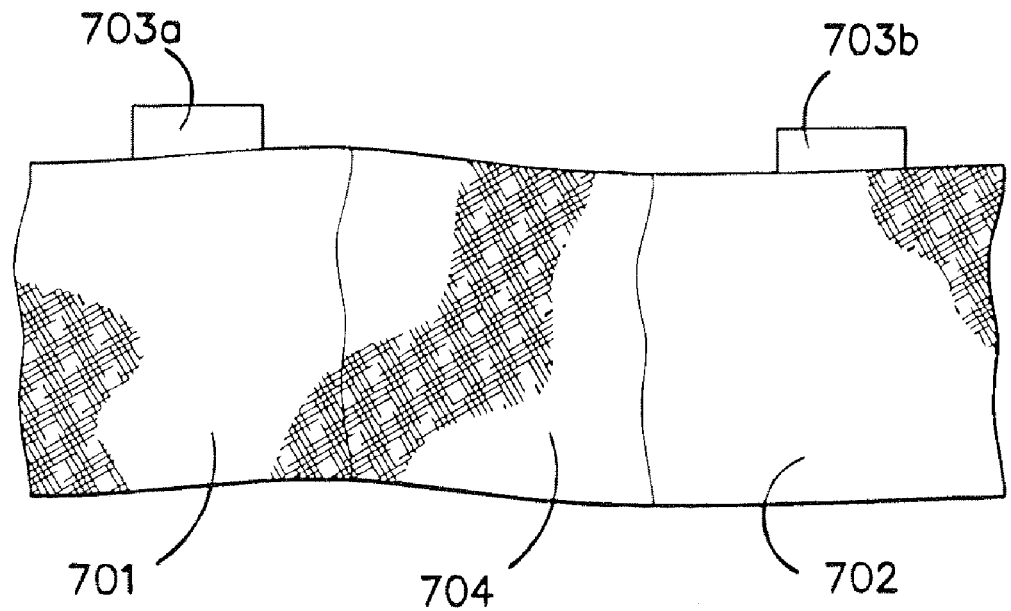
FIG. 7 is a plan view of the anode, separator and cathode components of an energy storage device of a seventh embodiment of the invention.
Figure 7A:
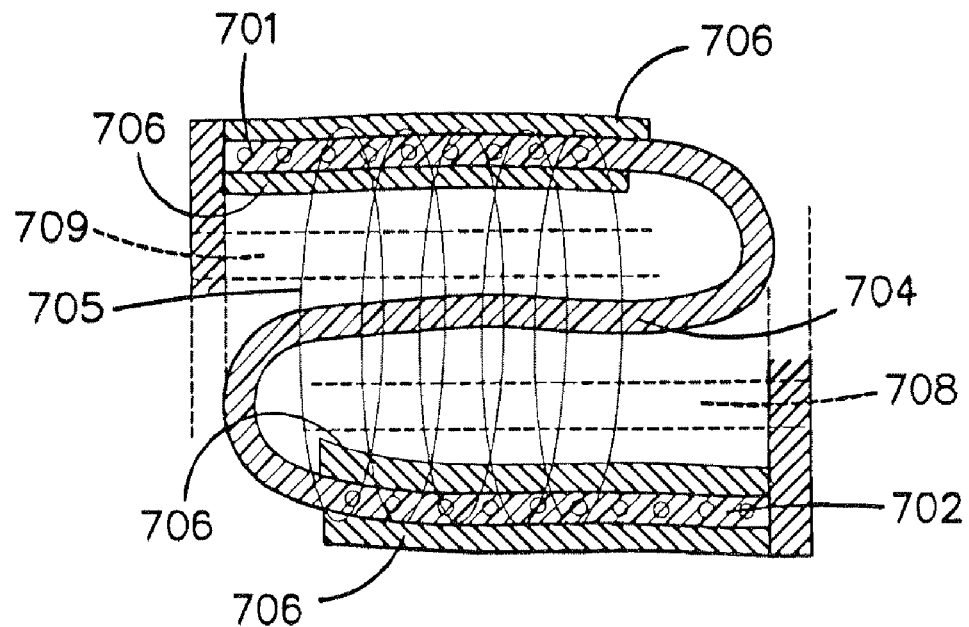
FIG. 7a is a schematic top view of the components illustrated in FIG. 7 configured into an energy storage device cell.
Figure 8:
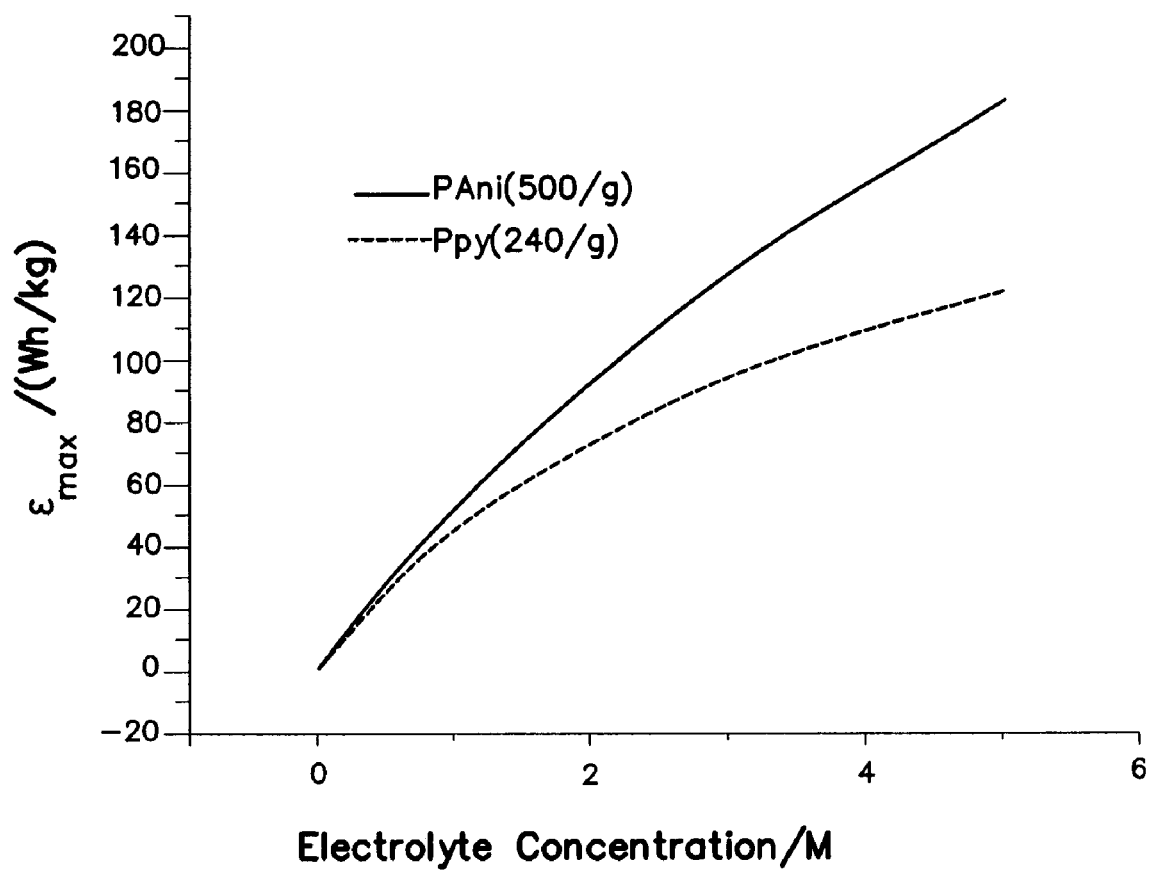
FIG. 8 is a graph showing the energy density of the cell illustrated in FIG. 7.

The electrolyte used in the embodiment of FIG. 7 is the ionic liquid methyl butyl pyrrolidinium bis[trifluoromethansulfonyl]imide, containing lithium dopant (in the form of 0.5 mol/kg of lithium pyrrolidinium bis[trifluoromethansulfonyl]imide). Other ionic liquids can be used, such as other ionic liquids from the pyrrolidinium and piperidinium bis[trifluoromethansulfonyl]imide families.

On charging of the cell, the lithium is deposited from the electrolyte onto the copper coated fabric of the cell, forming the anode in-situ. A cell prepared in this way using a highly lithiated electrolyte and a polypyrrole conducting polymer cathode can produce a device with an energy density of approximately 50 Wh/kg as represented by the graph shown in FIG. 8.

In a variation of the embodiment shown in FIG. 7, the current collectors of the anode and cathode, and the separator may be formed from separate sheets of fabric. The current collectors may also be of the type described and illustrated with reference to FIGS. 2-6.

FIG. 9

Figure 9:
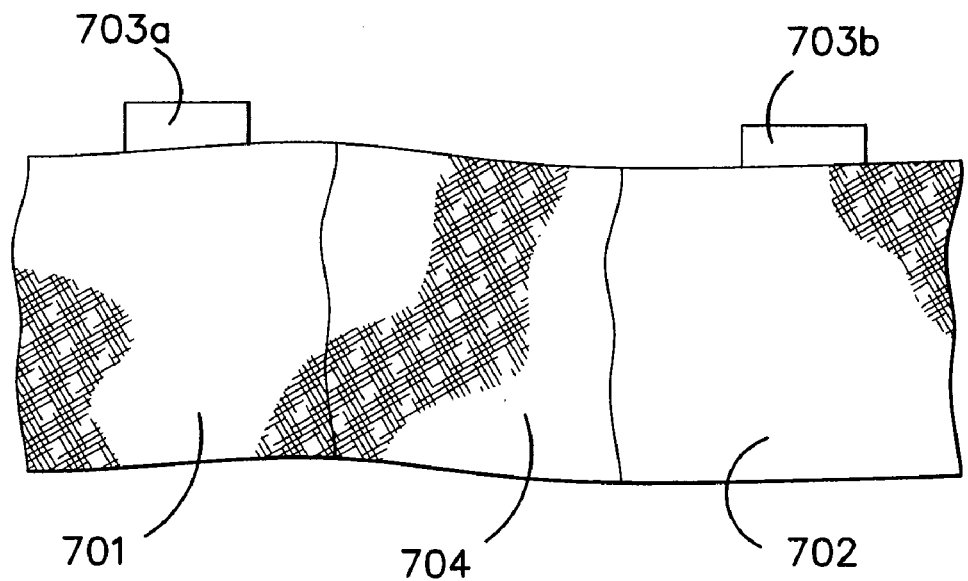
FIG. 9 is a plan view of the anode, separator and cathode components of an energy storage device of an eighth embodiment of the invention.
Figure 9A:
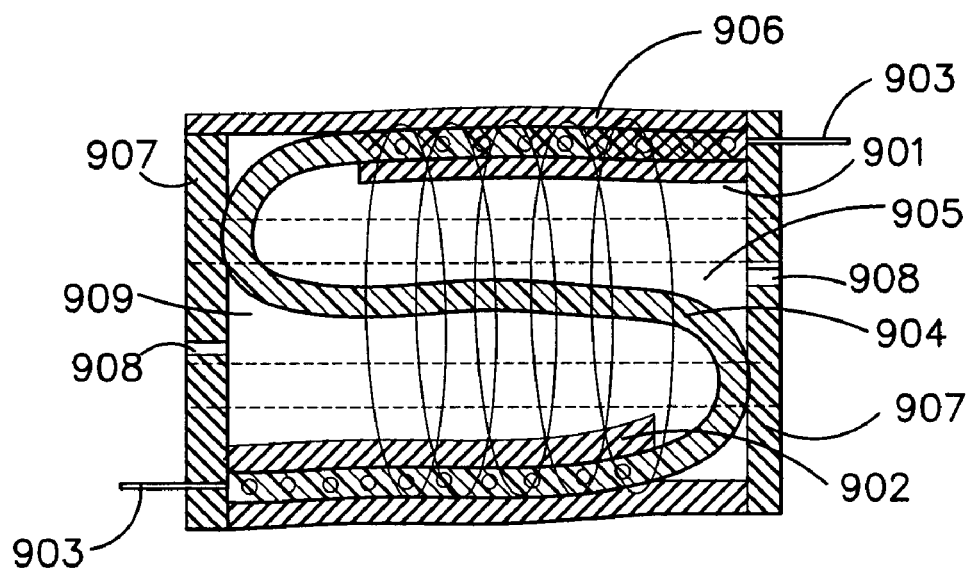
FIG. 9a is a schematic top view of the components illustrated in FIG. 9 configured into an energy storage device cell.

The arrangement illustrated in FIG. 9 contains the same components as that illustrated in FIG. 7, and is constructed in the same manner, with the one modification being that the three folded layers are woven together, in a style known in the fabrics industry as Jacquard (905). This weaving technique places pressure on the layers to ensure good contact between the electro-active materials and the metal current collector wires or metallised fabrics. The numerals in FIG. 9 represent the anode-forming current collector region (901), the cathode-forming current collector region (902), the current collector tabs (903) and the separator-forming region (904), Jacquard weaving stitches (905), the coating for forming part of the housing (906), the sealant (907), the gaps (908) which are later filled with sealant, and the electrolyte (909).

FIG. 10

Figure 10:
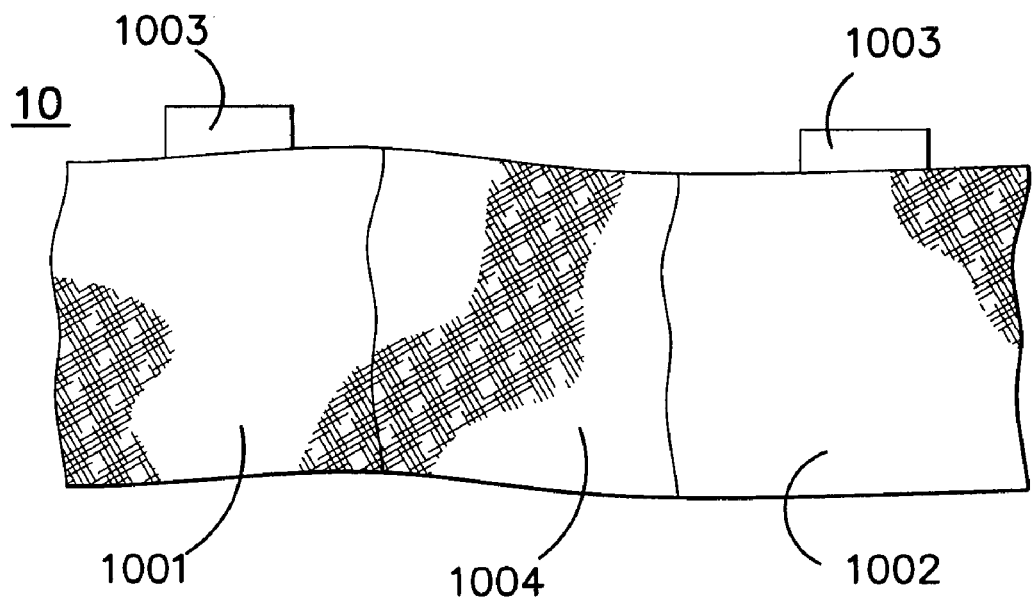
FIG. 10 is a plan view of the anode, separator and cathode components of an energy storage device of a ninth embodiment of the invention.
Figure 10A:
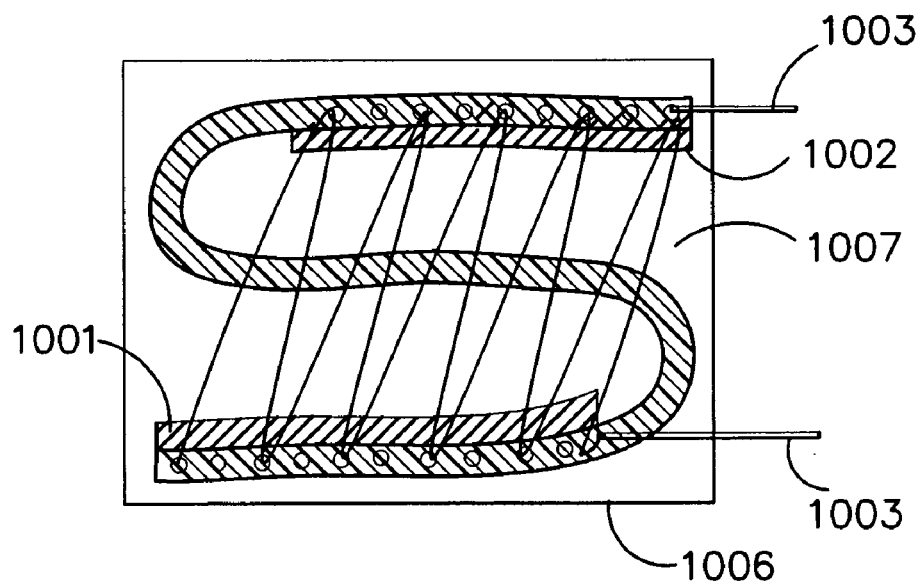
FIG. 10a is a schematic top view of the components illustrated in FIG. 10 configured into an energy storage device cell.

The energy storage device of the embodiment illustrated in FIG. 10 comprises the same basic components of the anode (1001), cathode (1002), collector tabs (1003) and separator (1004) as in the device illustrated in FIG. 7. These are constituted in the same manner as in FIG. 7, and are stitched together in a folded pattern to maintain stack pressure. In the embodiment of Example 10, the housing is formed in a different manner to that described in FIG. 7.

The cell comprising the anode, cathode and separator is laminated in a plastic pouch or vacuum-sealed in a soft packaging (1006) of a type commonly used for lithium-ion batteries. The collector tabs (1003) extend outside the housing, and the housing includes two filling holes for filling of the housing with electrolyte (1007). The pouch is then filled with the electrolyte and sealed. On charging of the cell, the lithium is deposited from the electrolyte onto the copper coated fabric of the cell, forming the anode in-situ.

FIG. 11

Figure 11:
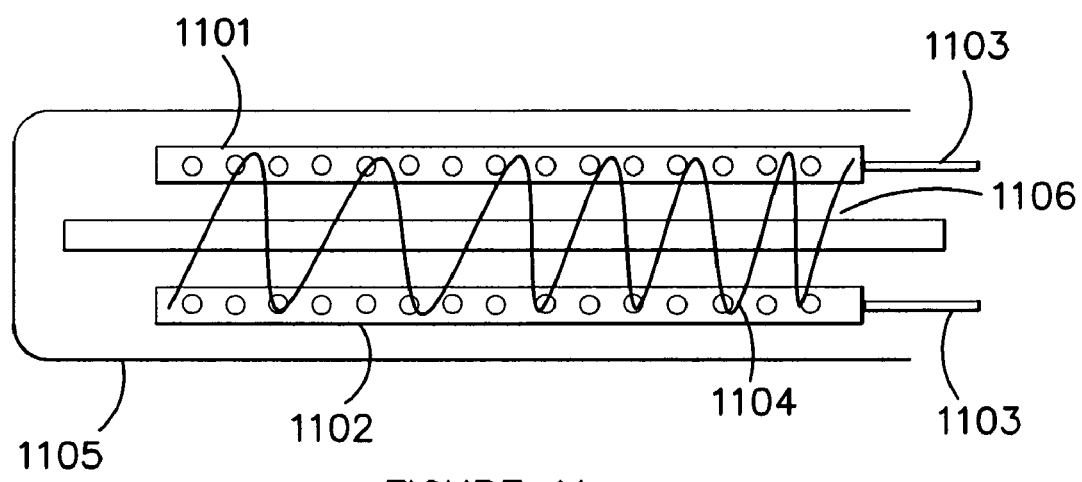
FIG. 11 is a plan view of an energy storage device of a tenth embodiment of the invention.

According to the embodiment illustrated in FIG. 11, the energy storage device is constructed with separate sheets of fabric forming the anode (1101), cathode (1102) and separator (1103). In this case, the anode and cathode are formed using the current collectors of the second embodiment illustrated in FIG. 1, although the current collectors of FIGS. 2-6 could be used. The separator is a fabric separator of a type commonly used in the art. In the case of the anode (1101), the metal wires are copper. This structure of this embodiment is woven (1104) as in the case of the embodiment of FIG. 9, although stitching is also an option, to provide cell pressure. The cell is placed into a heat sealed soft-packaging (1105) with two holes (1106) for filling of electrolyte, although the padded and sealed pouch of the type described with reference to FIG. 7 can be used. The pouch is then filled with the electrolyte (of the type described in the context of FIG. 7) and sealed. On charging of the cell, the lithium is deposited from the electrolyte onto the copper coated fabric of the cell, forming the anode in-situ.

Figure 12:
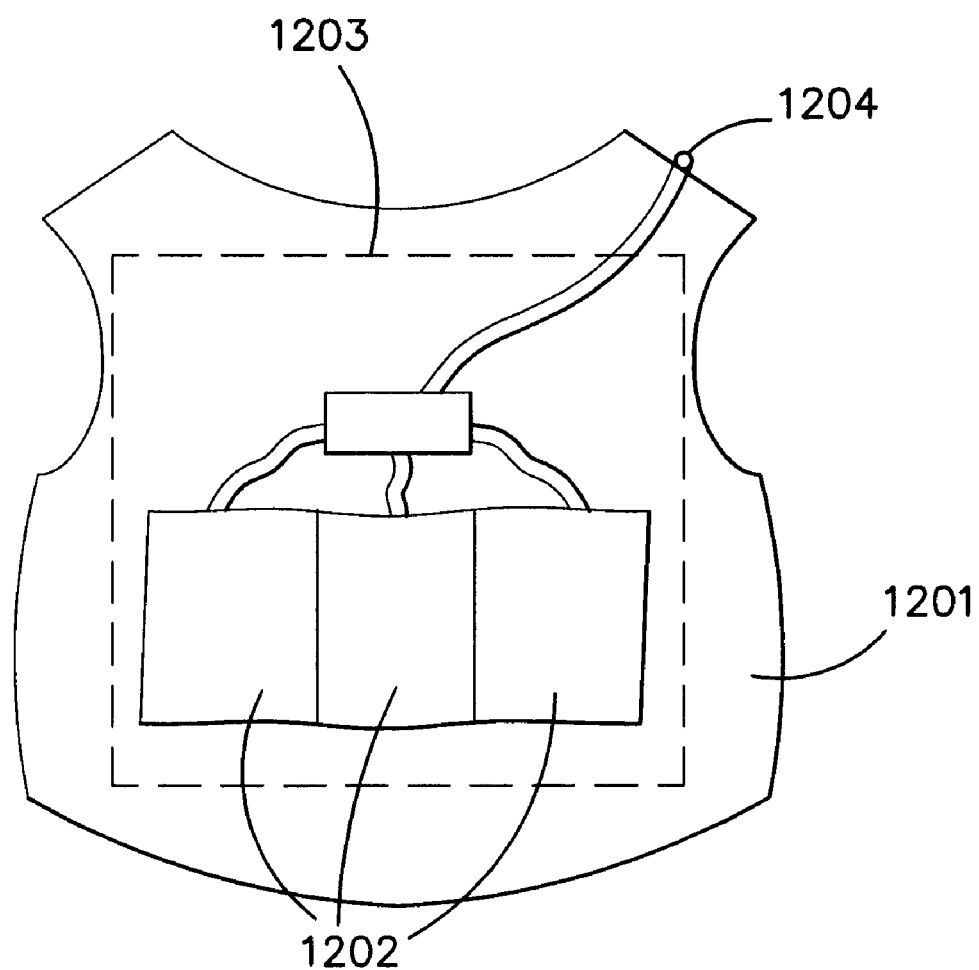
FIG. 12 is a side view of a garment containing the energy storage device of an embodiment of the invention.

Application for the Device—FIG. 12

In one embodiment, the device is integrated into the back of a military flak jacket (1201), The battery or asymmetric super-capacitor (1202) can be incorporated between the Kevlar layers (1203) of the jacket with connections on the front of the jacket for devices to plug into it (1204).

Many modifications to the embodiments described above can be made without departing from the spirit and scope of the invention.

The invention claimed is:

1. A flexible lithium-based energy storage device comprising:
a flexible housing;
an ionic liquid electrolyte comprising lithium mobile ions contained within the housing;
an anode comprising a current collector and anode material supported on the current collector, the
current collector comprising a fabric substrate and an electron-conductive material, wherein the electron-conductive material contains voids to enable penetration of the current collector by the electrolyte; and
a cathode comprising a current collector 15 and cathode material supported on the current collector,
the current collector comprising a fabric substrate and an electron-conductive material, wherein the electron-conductive material contains voids to enable penetration of the current collector by the electrolyte.

2. The flexible energy storage device of claim 1, wherein the fabric substrates of the anode and cathode are non-conductive in the absence of the electron-conductive material.

3. The flexible energy storage device of claim 1, wherein the electron-conductive materials of the anode and cathode are selected from the group consisting of metals, metal alloys, conductive carbon materials, conductive carbon yarns, conductive ceramics and conductive oxides.

4. The flexible energy storage device of claim 1, wherein the current collector:
    (a) comprises fibres which are coated by the electron-conductive material, prior to formation of the coated fibres into said fabric, or
    (b) comprises an array of threads of electron-conductive materials extending through the fabric.

5. The flexible energy storage device of claim 4, wherein the current collector is of type (b) and the spacing between the adjacent threads is between 0.1 mm and 20 mm.

6. The flexible energy storage device of claim 1, wherein the current collector for each of the cathode and anode are of the same material and construction.

7. The flexible energy storage device of claim 1, wherein the current collector for each of the anode and the cathode are regions of a continuous sheet of fabric.

8. The flexible energy storage device of claim 7, wherein the sections of the sheet of fabric that constitute the anode and cathode overlie one another.

9. The flexible energy storage device of claim 8 comprising a separator, wherein the separator is located between the anode and cathode sections that overlie one another.

10. The flexible energy storage device of claim 1, comprising a separator.

11. The flexible energy storage device of claim 9, wherein the separator is a fabric separator.

12. The flexible energy storage device of claim 1, wherein the anode material is selected from the group consisting of lithium metal, lithiated carbonaceous materials, lithium intercalating metal oxide based materials, metal alloys and conducting polymers.

13. The flexible energy storage device of claim 1, wherein the cathode material is selected from the group consisting of lithium intercalating metal oxide materials, lithium intercalating conducting polymers, redox conducting polymers, capacitor cathode materials, and combinations thereof.

14. The flexible energy storage device of claim 12, wherein the anode material is lithium metal.

15. The flexible energy storage device of claim 1, wherein the ionic liquid electrolyte is a salt of a pyrrolidinium- or a piperidinium-based cation.

16. The flexible energy storage device of claim 1, wherein the lithium concentration of the electrolyte is from 0.01 to 2.0 mol/kg.

17. The flexible energy storage device of claim 1, comprising stitching or weaving of the fabric layers of the device together to maintain stack pressure across the cell.

18. An article comprising a flexible energy storage device as claimed in claim 1.

19. A garment, jacket, medical article, monitoring device, bandage, wound dressing, military article, portable electronic device, mobile phone or radio comprising the flexible energy storage device of claim 1.

* * * * *